(12) United States Patent
Elwin et al.

(10) Patent No.: US 7,522,759 B2
(45) Date of Patent: Apr. 21, 2009

(54) SELF-SERVICE TERMINAL

(75) Inventors: David Elwin, Angus (GB); Lynn M. McKenzie, Dundee (GB); Craig S. Nicol, Dundee (GB)

(73) Assignee: NCR Corporation, Dayton, OH (US)

( * ) Notice: Subject to any disclaimer, the term of this patent is extended or adjusted under 35 U.S.C. 154(b) by 826 days.

(21) Appl. No.: 11/007,002

(22) Filed: Dec. 8, 2004

(65) Prior Publication Data

US 2005/0131823 A1 Jun. 16, 2005

(30) Foreign Application Priority Data

Dec. 11, 2003 (GB) ................................. 0328723.2

(51) Int. Cl.
*G06K 9/00* (2006.01)
(52) U.S. Cl. .................. 382/135; 382/137; 235/475
(58) Field of Classification Search ................ 382/135, 382/112, 137, 138, 139, 140, 305, 312, 306, 382/317, 274, 275; 356/71, 328; 209/534, 209/551; 194/207; 271/10.03, 11, 9.02, 271/122, 315, 303, 121, 35, 107, 187, 10.08, 271/10.11, 125, 104, 98, 263; 902/15, 16, 902/13, 17; 377/8; 235/379, 475, 381, 449; 221/211, 1, 21; 250/559.4, 227.11; 705/43, 705/45, 241; 109/24.1
See application file for complete search history.

(56) References Cited

U.S. PATENT DOCUMENTS

| | | | | |
|---|---|---|---|---|
| 5,897,625 A * | 4/1999 | Gustin et al. ................... 705/43 |
| 6,454,163 B2 * | 9/2002 | Peebles et al. ............... 235/379 |
| 6,486,464 B1 * | 11/2002 | Ma et al. ................. 250/223 R |
| 6,758,395 B2 * | 7/2004 | Elwin .......................... 235/379 |
| 6,789,795 B2 * | 9/2004 | Kallin et al. ................. 271/272 |
| 7,066,335 B2 * | 6/2006 | Aas et al. ..................... 209/534 |
| 2002/0152169 A1 * | 10/2002 | Dutta et al. .................... 705/45 |
| 2005/0173659 A1 * | 8/2005 | Jespersen et al. ......... 250/559.4 |

FOREIGN PATENT DOCUMENTS

| | | |
|---|---|---|
| DE | 27 23 078 A1 | 12/1977 |
| EP | 1 418 549 A1 | 5/2004 |
| WO | WO 01/99059 A1 | 12/2001 |

OTHER PUBLICATIONS

Patent Abstracts of Japan, vol. 1999, No. 02, Feb. 26, 1999 & JP 10 302112 A (Hitachi Ltd; Chubu Hitachi Electric:KK), Nov. 13, 1998.

* cited by examiner

*Primary Examiner*—Sheela C Chawan
(74) *Attorney, Agent, or Firm*—Michael Chan

(57) ABSTRACT

A self-service terminal (10) comprises: a fascia (12) having a note entry/exit slot (56); and a note processing module (60) for processing notes deposited via the slot. The note processing module (60) includes a note transport mechanism (70, 70A) for transporting notes between the slot and a note imaging means (74) arranged to scan the notes at a first speed. The transport mechanism includes a loop (70A) arranged to transport notes through the imaging means (74) a second time at a second speed, the first speed being greater than said second speed.

11 Claims, 5 Drawing Sheets

SELF-SERVICE TERMINAL

The present invention relates to a self-service terminal (SST), such as an automated teller machine (ATM). In particular, the invention relates to an SST adapted for bank note deposit as well as dispensing.

BACKGROUND OF THE INVENTION

When bank notes are deposited at an ATM it is necessary to determine if the notes are legal or counterfeit. One process used in this determination is the taking of an image of each deposited note. This is achieved using a high resolution, at 100 dots per inch (DPI) or greater camera system. In addition it is now a legal requirement, of some licensing authorities such as the European Central Bank, to be able to trace each deposited note back to the customer who deposited the note.

As every bank note carries a serial number, printed in substantially the same place with standard sized characteristics, it would seem ideal to use the imaging technology within the ATM to trace the notes. Each note can then be referred to the user who deposited the note. However, notes can be deposited, as customers demand, at very high speeds (greater than 5 notes per second). At this speed the recognition engine comprising the high resolution camera operates at closer to 40 DPI. This resolution is sufficient to recognize the image of a note, but it is not good enough to read a serial number off of a note.

Therefore, it would appear that in order to utilize imaging to trace notes to a user very much more expensive higher resolution cameras and optics will be required.

SUMMARY OF THE INVENTION

It is among the objects of an embodiment of the present invention to obviate or mitigate the above disadvantage or other disadvantages of prior art self-service terminals.

According to a first aspect of the present invention there is provided a self-service terminal comprising: a fascia having a note entry/exit slot; and a note processing module for processing notes deposited via the slot, the note processing module including a note transport mechanism for transporting notes between the slot and a note imaging means, the imaging means being arranged to scan the notes at a first speed, the transport mechanism including a loop arranged to transport notes through the imaging means a second time at a second speed, said first speed being greater than said second speed.

Preferably, the terminal comprises means for making a determination as to the validity of the note prior to imaging the note for a second time and wherein only notes that are considered to be invalid are imaged a second time.

Preferably, the terminal comprises a storage bin transport means arranged to transport imaged notes to the storage bin.

Preferably, the terminal further comprises a reject bin and transport means arranged to transport an imaged note to the reject bin if a determination is made that the note is invalid.

Alternatively, the terminal comprises an exit chute and transport means arranged to transport an imaged note back to the user if a determination is made that the note is invalid and the terminal determines that the user who deposited the note is still operating the terminal.

According to a second aspect of the present invention there is provided a note processing module including a note transport mechanism for transporting notes between the slot and a note imaging means, the imaging means being arranged to scan the notes at a first speed, the transport mechanism including a loop arranged to transport notes through the imaging means a second time at a second speed, said first speed being greater than said second speed.

According to a third aspect of the present invention there is provided a method of depositing a bank note, the method comprising the steps of: transporting a bank note between an entrance slot and a note imaging means, utilizing the imaging means to scan the notes at a first speed, transporting said notes through the imaging means a second time at a second speed, wherein said first speed is greater than said second speed.

BRIEF DESCRIPTION OF THE DRAWINGS

These and other aspects of the present invention will be apparent from the following specific description, given by way of example, with reference to the accompanying drawings, in which.

DETAILED DESCRIPTION

Figure 1:
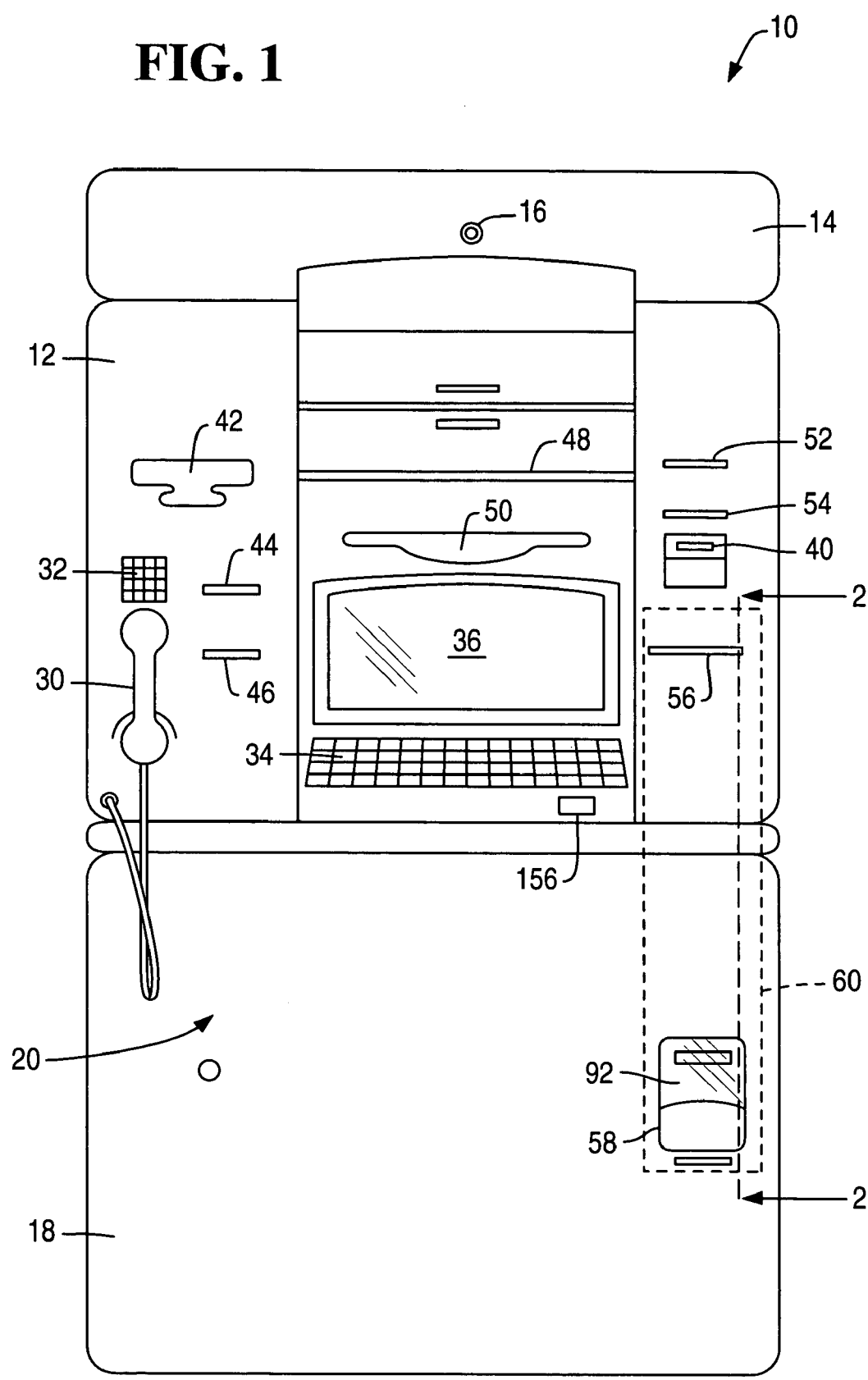
FIG. 1 is a pictorial diagram of a self-service terminal according to one embodiment of the present invention.

Reference is first made to FIG. 1, which illustrates a self-service terminal 10 in the form of a deposit ATM. The ATM 10 comprises a fascia 12 pivotably coupled to a chassis (not shown); an upper panel 14 mounted to the chassis and defining an aperture 16 through which a camera (not shown) images a user of the ATM 10; and a lower panel 18 hingeably coupled to the chassis (not shown) so that the lower panel 18 can be opened to reveal a safe (not shown) mounted in the chassis (not shown).

When the lower panel 18 is open, the fascia 12 can be pivoted upwards to reveal ATM modules mounted within the chassis (not shown).

The fascia 12 and lower panel 18 provide a user interface 20 for allowing a user to execute a transaction. The fascia 12 includes a handset 30 and a telephone keypad 32 for allowing a user to contact a remote operator (not shown) typically located in a call center (not shown). The fascia 12 also includes an encrypting keyboard 34 for allowing a user to enter transaction details, and a display 36 for presenting screens to a user.

The fascia 12 also defines eight slots for receiving and dispensing media items, and a tray 40 into which coins can be dispensed. The slots include: a money order printer slot 42, a bunch note input slot 44, a bunch note exit slot 46, a statement output slot 48, a cash dispense slot 50, a card reader slot 52, a card issue slot 54, and a note input/output slot 56. The slots 42 to 56 and tray 40 are arranged so that when the fascia 12 is closed, the slots and tray align with corresponding ATM modules mounted within the ATM's chassis (not shown).

The user interface features described above are all provided on an NCR PERSONAS™ 5878 financial services center ATM, available from NCR Financial Solutions Group Limited, Discovery Center, 3 Fulton Road, Dundee, DD2 4SW, Scotland.

However, in this embodiment of the invention an NCR PERSONAS™ 5878 ATM has been modified to include a lower dispense area 58. The dispense area 58 is located beneath the note input/output slot 56 and is fed by a deposit module 60 located within the ATM chassis (not shown).

Figure 2:
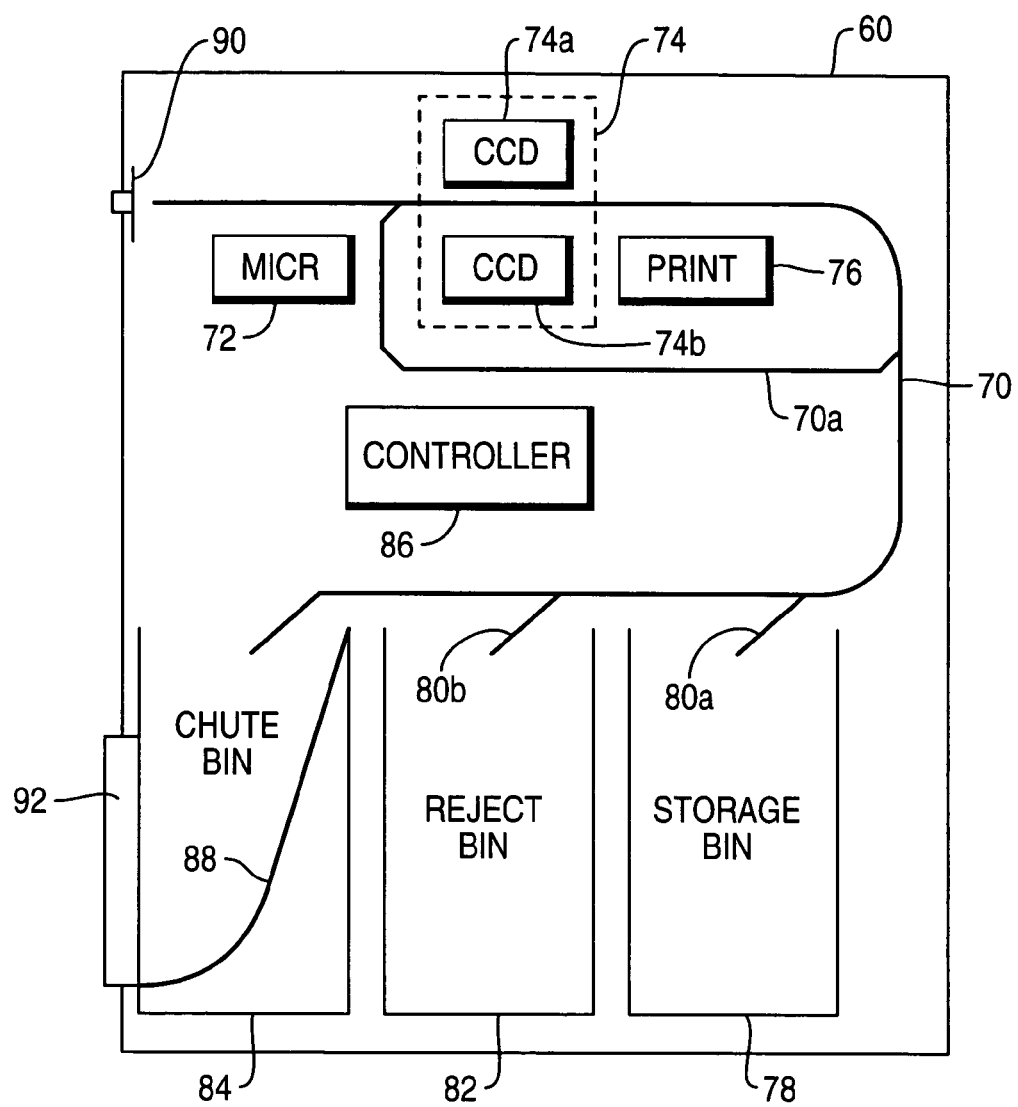
FIG. 2 is a simplified schematic sectional diagram showing a part (the deposit module) of the terminal of FIG. 1.
Figure 3:
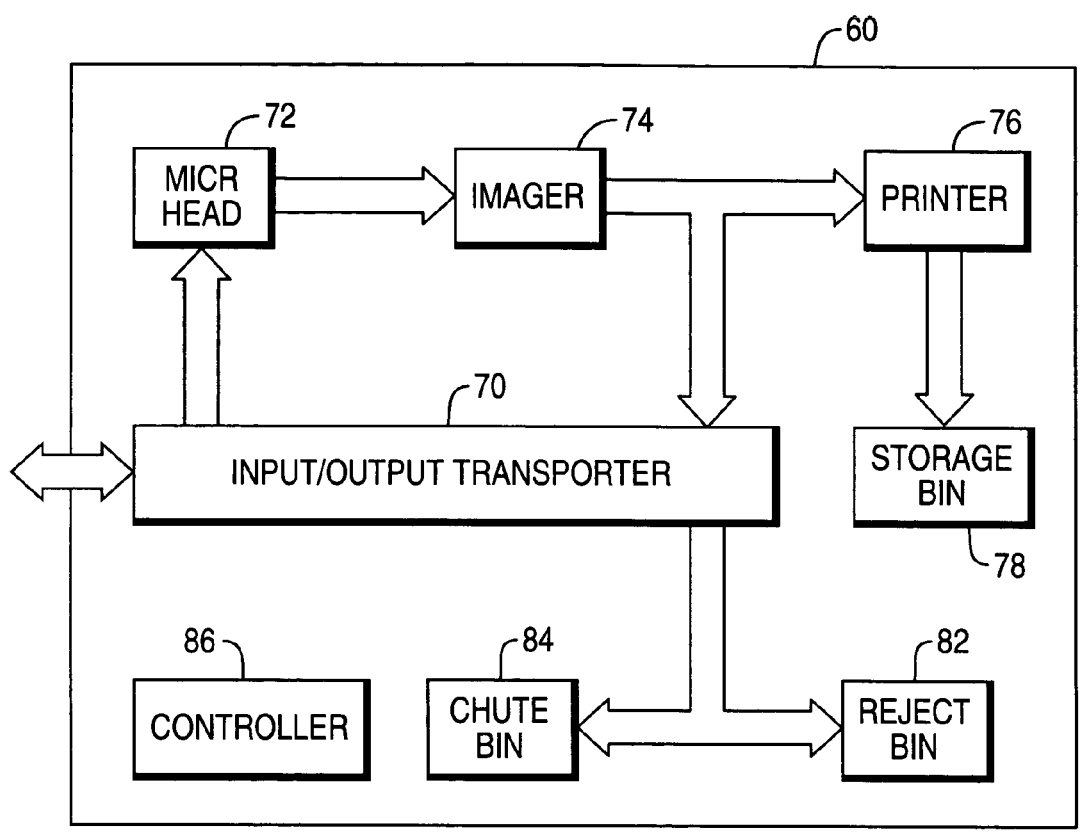
FIG. 3 is a pictorial diagram of a part (the lower dispense area) of the terminal illustrated in FIG. 1.

The deposit module 60 will now be described with reference to FIG. 2 and FIG. 3. FIG. 2 is a simplified schematic sectional diagram (along line 2-2 in FIG. 1) showing part of the fascia 12 and lower panel 18, and the main parts of the module 60. FIG. 3 is a block diagram illustrating the main elements in the module 60.

The module 60 is a modified version of a conventional deposit module.

The module 60 comprises the following elements: a note input/output transport mechanism 70 including an alignment mechanism for aligning a note; a MICR head 72 for reading magnetic details on a code line of a note (if present); an imager 74 including an upper 74a and lower 74b CCD camera for capturing an image of each side of a note (front and rear); a printer 76 and a storage bin 78 for storing processed notes. The transport mechanism 70 includes two divert gates 80a, 80b for diverting notes to either a reject bin 82 or a chute bin 84. The elements (70 to 82) are conventional and will not be described in detail herein.

The module 60 also includes a controller 86 for controlling the operation of the elements (70 to 80) within the module 60.

The chute bin 84 includes a chute 88 in the form of a steep, sloping plastics guide arranged to deliver a note from the transport mechanism 70 to the dispense area 58 using the force of gravity.

The module 60 also includes an entrance shutter 90 for opening and closing the input/output slot 56, and a dispense area shutter 92 for allowing user access to the chute 88.

Figure 4:
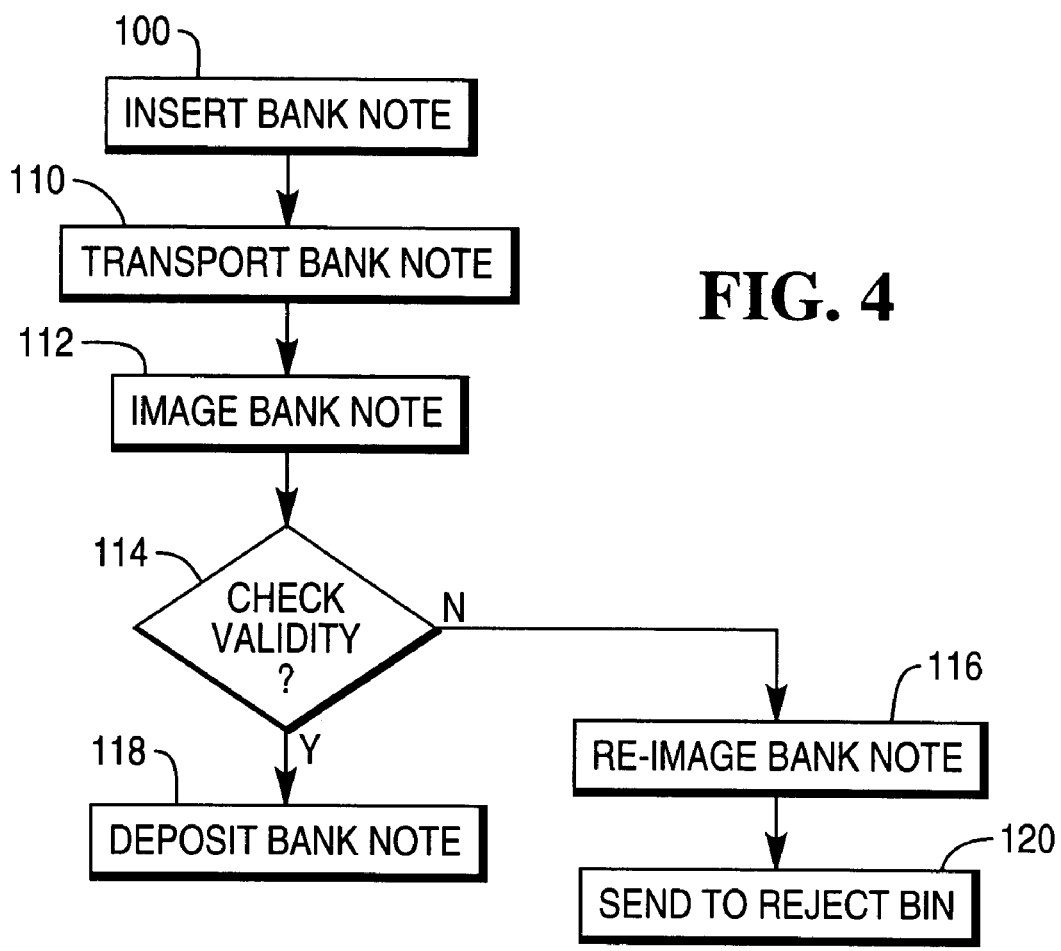
FIG. 4 is a flowchart illustrating the steps involved in a deposit operation.

A typical transaction will now be described with reference to FIG. 4, which is a flowchart illustrating the steps involved, in one embodiment, in depositing a note.

Initially, a user enters an account card into the card reader slot 52, selects "deposit" from a list of transaction options presented on the display 36, and inserts the note to be deposited through the input/output slot 56 (step 100).

The module controller 30 opens the slot shutter 90 to receive the note, and transports the received note (step 110) to the imager 74 where both sides of the note are imaged (step 112).

A determination is then made as to the validity of the note (step 114). If the note is not considered to be valid then the note is transported around the loop 70A at a lower speed than previously (step 116), allowing the camera to re-image the note such that these images have a relatively higher resolution (e.g., 100 DPI) than the previous images. In this way a clear image of the serial number on the note can be obtained. The serial number can now be associated together with the user conducting the transaction, and both can be stored in an ATM transaction log (e.g., using the journal printer) to allow subsequent investigation of this transaction should such investigation be necessary (such as if the note is subsequently determined to be counterfeit).

As this re-imaging happens, the time taken does not impinge on deposit transaction times as witnessed by the user. During this process the same user can be accessing other ATM services or a subsequent user can be gaining access to the ATM services by entering his or her account card and PIN etc. in the usual manner. During this second scan the serial number of the note is imaged. After the first scan valid notes are transported to the storage bin 78 (FIG. 2) (step 118).

Figure 5:
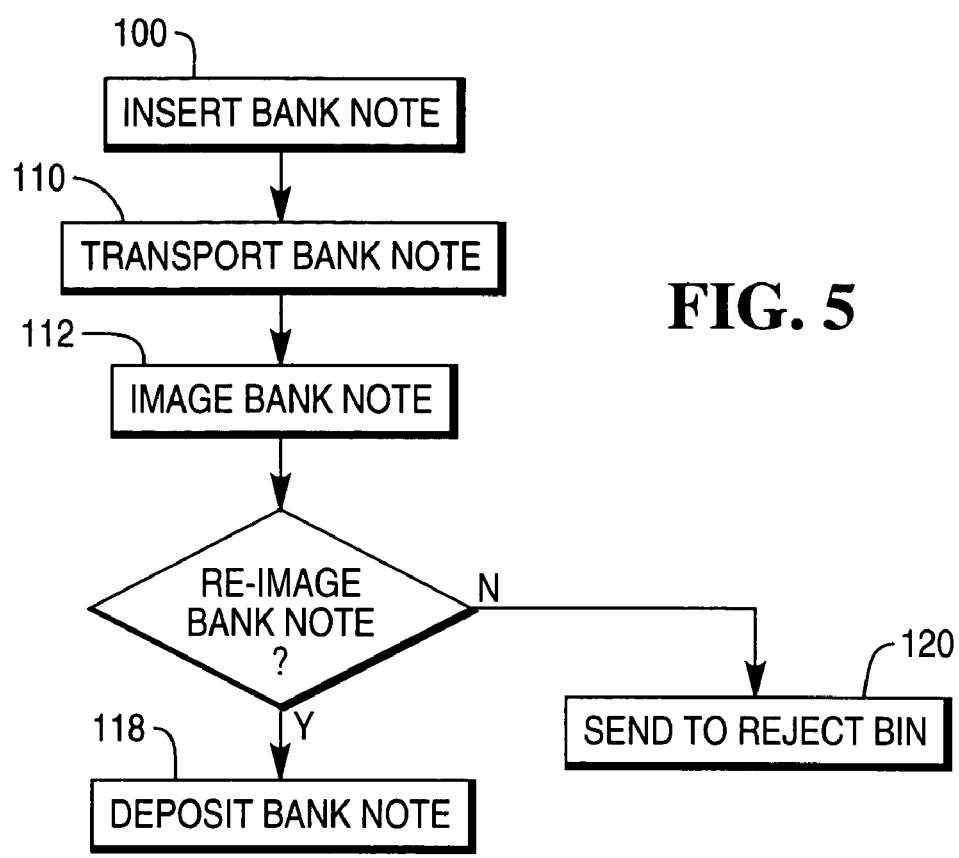
FIG. 5 is a flowchart illustrating the steps involved in an alternative deposit operation.

In the embodiment illustrated in FIG. 5 the terminal is arranged to re-scan all deposited notes, without first making a determination as to the validity of the note. In all other ways the embodiment of FIG. 5 is the same as that of FIG. 4.

Various modifications may be made to the above-described embodiment within the scope of the invention. In addition, although the invention has been described in terms of bank notes other financial instruments such as checks can be deposited in the same manner and the term "note" in the invention as claimed is intended to cover that possibility. Also, this document and related drawings refer to a single note acceptor. However, the invention will also apply to a bunch note acceptor with an ESCROW or some means of storing the notes.

What is claimed:

1. A self-service terminal comprising:
    a fascia having a note entry/exit slot;
    an imager for imaging notes;
    a note transport mechanism for transporting at a first speed a note from the slot past the imager to allow the imager to image the note a first time, the transport mechanism including a loop by which the note can be transported back past the imager at a second speed which is less than the first speed to allow the imager to image the note a second time which is after the first time; and
    a controller for making a determination of validity of a note prior to imaging the note the second time, wherein only a note which is not considered valid is imaged the second time.

2. A self-service terminal as claimed in claim 1, further comprising a storage bin to which imaged notes can be transported.

3. A self-service terminal as claimed in claim 1, further comprising a reject bin to which an imaged note can be transported if a determination is made that the note is invalid.

4. A self service terminal as claimed in claim 1, further comprising an exit chute to which an imaged note can be transported back to the user if a determination is made that the note is invalid and a determination is made that the user who deposited the note is still operating the terminal.

5. A note processing module comprising:
    means defining a slot through which a note can be received;
    an imager which can capture an image of a note;
    a note transport mechanism for (i) transporting at a first speed a note from the slot to the imager to allow the imager to capture a first image of the note at a first time, and (ii) transporting at a second speed which is less than the first speed the note back to the imager to allow the imager to capture a second image of the note at a second time which is after the first time; and
    a controller for making a determination of validity of a note prior to imaging the note the second time, wherein only a note which is not considered valid is imaged the second time.

6. A module as claimed in claim 5, further comprising a storage bin to which imaged notes can be transported.

7. A module as claimed in claim 5, further comprising a reject bin to which an imaged note can be transported if a determination is made that the note is invalid.

8. A module as claimed in claim 5, comprising an exit chute to which an imaged note can be transported back to the user if a determination is made that the note is invalid and a determination is made that the user who deposited the note is still operating the terminal.

9. A method of depositing a bank note, the method comprising:
    transporting at a first speed the bank note from an entrance slot past an image capture device to allow the image capture device to capture at a first time a first bank note image; and transporting at a second speed which is less than the first speed the bank note back past the image capture device to allow the image capture device to capture at a second time which is after the first time a second bank note image which has a relatively higher resolution than the first bank note image;

wherein (i) the first bank note image has an effective resolution of approximately 40 dots per inch, and (ii) the second bank note image has an effective resolution of approximately 100 dots per inch.

10. A method comprising:

transporting a bank note from an entrance slot past an image capture device at a first speed to allow the image capture device to capture a bank note image;

directing the bank note to a storage bin when the bank note is considered valid; and re-directing the bank note back past the image capture device at a second speed which is less than the first speed to allow the image capture device to capture another bank note image when the bank note is not considered valid.

11. A method as claimed in claim 10, wherein (i) the effective resolution of the first captured bank note image is less than the effective resolution of the second captured bank note image.

* * * * *